July 18, 1939. T. PETERSEN 2,166,369
SOLID SCREW CUTTING DIE
Filed Jan. 14, 1936
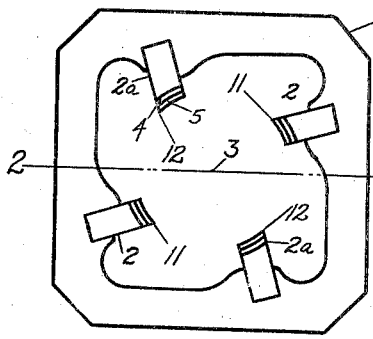
FIG-1
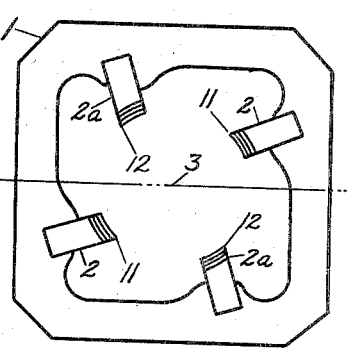
FIG-3
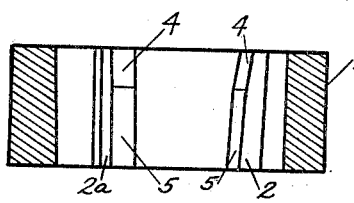
FIG-2
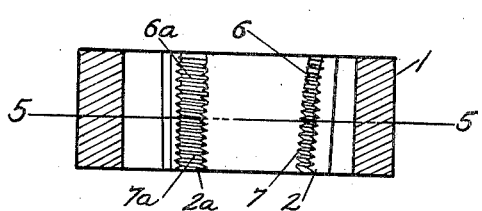
FIG-4
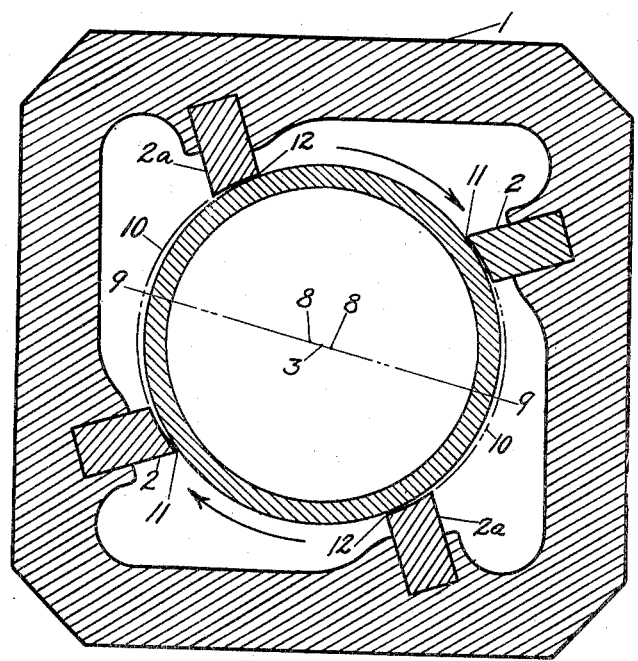
FIG-5.
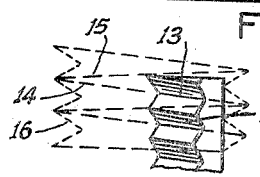
FIG.6.
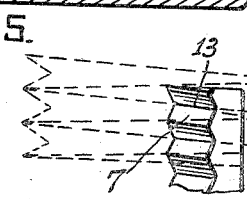
FIG.7
FIG-5a
Thorvald Petersen
INVENTOR.
By
ATTORNEYS.

Patented July 18, 1939

2,166,369

UNITED STATES PATENT OFFICE 2,166,369

SOLID SCREW CUTTING DIE

Thorvald Petersen, Erie, Pa., assignor, by mesne assignments, to Security-Peoples Trust Company, Erie, Pa., a corporation of Pennsylvania Application January 14, 1936, Serial No. 59,049

5 Claims. (Cl. 10—111)

The present invention is designed to improve solid screw cutting dies and the method of making them. Such dies as heretofore commonly made have been provided with a number of chasers, usually four, and these chasers have been so related and formed that the cutting of the thread has been effected by all the chasers. This has resulted in an undesirable torque pull on the die to effect a thread cutting operation and also reduces the effective life of the die.

In the present invention some of the chasers are formed to effect cutting action while other chasers are formed to act simply as guides to assist in maintaining proper centering of the cutting dies. In the four-chaser die, for example, two of the chasers are formed to cut and two of the chasers to act as guides. Where all four of the chasers are formed for cutting, the cut of each chaser is so shallow that there is a tendency for some of the chasers to ride the surface to be cut rather than cutting such surface, thus creating wear and added drag, the two cuts of the chaser making a more desirable depth cut and reducing the number of cuts by half. The invention also involves relieving the cutting chasers toward the rear of the chasers and the guiding chasers toward the front of the chasers so as to present as little friction as possible and easy cutting relation.

It also permits of a simple method of varying the angle of the spiral of the teeth from that of the true pitch spiral of the die to crowd the advancing slope of the teeth in the advanced direction, so that the entire cut of the thread may be made on one slope, thus reducing torque load.

Features and details of the invention will appear from the specification and claims.

A preferred embodiment of the invention is illustrated in the accompanying drawing as follows:

Fig. 1 shows the die at the completion of a preliminary reaming action.

Fig. 2 a section on the line 2—2 in Fig. 1.

Fig. 3 a plan view of the die with the threads completed.

Fig. 4 a section on the line 4—4 in Fig. 3.

Fig. 5, an enlarged view of the die in section on the line 5—5 in Fig. 4.

Fig. 5a shows enlarged section of a chaser.

Fig. 6 shows a fragment of a chaser and the outline of a thread having a pitch and diameter corresponding to the arc of the chaser.

Fig. 7 shows a similar view of the same chaser with its relation to a thread of greater diameter.

1 marks the die wall which has the usual octagonal form, 2—2 the cutting chasers, 2a—2a the guiding chasers. In forming the die, a reaming tool is passed through the die operating on the center 3 of the die and forming the surfaces 4 for the starting thread forming teeth of the die and 5 for the finishing thread cutting teeth of the die, the surfaces 4 and 5 corresponding approximately to the crests of the teeth.

With the blank so formed fine starting threads 6 are formed in the surfaces 4 of the cutting chasers and cutting teeth 7 are provided of full depth for the finishing thread. As shown, these teeth are designed to cut a tapered thread such as is usually formed on pipe. The guiding chasers have the fine guiding teeth 6a corresponding to the teeth 6 and the teeth 7a corresponding in general outline and pitch to the teeth 7.

We have shown in Fig. 5 an enlarged view which indicates the form of the teeth and the manner of producing the desired form. In cutting the teeth 7 and 7a, the cutter for forming the teeth operates from a center as 8 offset from the center of the die and operates upon a pair of chasers, one of the pair being a cutting chaser and the other a guiding chaser. The center 8 is located in a line extending from the center 3 of the die midway between the pair of chasers being cut as indicated by the line 9—9 in Fig. 5. With this arrangement of the cutter, the arc traversed by the cutter and the curves of the teeth is indicated by line 10 which has its center at 8.

The cutting teeth 7 have their cutting edges 11 at the front of the chasers 2 and these teeth, it will be noted, are relieved toward the rear of the cutting chasers, because the cutting edges 11 are slightly closer to the center 3 of the die than the teeth at the rear edges of the cutting chasers, this being accomplished by the curve 10 which extends farther in to the chaser at the rear edge than at the front edge.

The reverse formation is effected on the guiding chasers 2a. Here the guiding ends 12 of the teeth 7a and 6a are relieved toward the front edges of the chasers, so that there is no cutting engagement of the front edges. The guiding teeth are slightly inclined to the cut surfaces of the threads, so that their principal guiding engagement is at their rear edges 12.

In forming the threads, first one pair of chasers is cut and if a tap is used, the threads of the opposite pair of chasers are cut to a slight depth in the same operation. Each pair has its finishing cut made separately and on its particular offset center 8. In Fig. 5 the offsetting is very much exaggerated over what is usually practiced, this off-setting being ordinarily only a few thousandths, preferably about eighteen thousandths in a one-inch die.

In operation the cutting chasers form a cut, the depth for each chaser of the cut being one-half of the advance incident to the pitch of the thread. The guiding chasers make no cut, but merely maintain the center position of the die and assist in advancing the die in making the cut.

It will be noted that the radial distance between the center 8 and the points 11 and 12 is slightly less than the radial distance from the center 3. Thus, a smaller tap is used than the standard tap designed to finish cut all the chasers. In this smaller tap, the angle of the spiral of the teeth is slightly greater than the true pitch spiral of the thread to be cut. This difference is illustrated in Figs. 6 and 7. In Fig. 6 the chaser is shown as it would operate in a die arranged to cut a thread on a piece having a radius corresponding to the radius of the arc of the threads of the die. Fig. 7 shows the same chaser with its relation to a piece having a greater radius. As shown in the drawing, the teeth 7 have the peaks 13 and the peak line is extended by the dash line 14 the threads being indicated by the dash lines 16 and the return peak line indicated by the line 15. In Fig. 7 the peak line of the chaser is extended by the dash line 14a. The peak line of the piece of larger radius which corresponds to the larger radius of the related chasers in the die is shown by the dash line 14b. The spiral of the chaser as represented by the line 14a has a very definitely greater inclination than the spiral represented by the line 14b of the thread cut. This peculiarity is carried into the die threads, so that the advancing slope of the die teeth are crowded forward by this added angularity of the teeth to effect a cut along the advancing slope of the thread. This not only reduces the cutting, but the flat chip requires a very much smaller torque load than the ordinary triangular shaped chip.

The guiding chasers are slightly farther from the center of the die than the cutting chasers, the difference being approximately the depth of the cut of each tooth.

What I claim as new is:

1. In a solid screw cutting die, the combination of a die wall; and chasers permanently fixed in said wall, said chasers being arranged in pairs, each pair comprising a cutting chaser with thread cutting teeth and a guide chaser having non-cutting guide teeth, the teeth of the chasers of each pair having their surfaces centered at a point offset from the center of the die toward the pair.

2. In a solid screw cutting die, the combination of a die wall; and chasers permanently fixed in said wall, said chasers being arranged in pairs, each pair comprising a cutting chaser with thread cutting teeth and a guide chaser having non-cutting guide teeth, the teeth of the chasers of each pair having their surfaces centered at a point offset from the center of the die on a line leading substantially from the center of the die midway between the chasers of the pair.

3. In a solid screw cutting die, the combination of a die wall; and chasers fixed in said wall, said chasers comprising cutting chasers having thread cutting teeth and guide chasers having teeth, said cutting teeth being relieved toward the rear of the cutting chasers and said guide teeth being relieved toward the front of said guide chasers, the angle of the spiral of said teeth having a pitch crowding the teeth of the cutting chasers against one slope and the teeth of the guiding chasers against the opposite slope.

4. In a solid screw cutting die, the combination of a die wall; and chasers fixed in said wall, said chasers being arranged in pairs, each pair comprising a cutting chaser with thread cutting teeth and a guide chaser having guide teeth, the teeth of the chasers of each pair having their surfaces centered at a point offset from the center of the die and the angle of the spiral of the teeth of the chasers having a pitch crowding the teeth of the cutting chasers against one slope and the teeth of the guiding chasers against the opposite slope.

5. In a solid screw cutting die, the combination of a die wall; and chasers permanently fixed in said wall, said chasers comprising cutting chasers having thread-cutting teeth and non-cutting guide chasers between the cutting chasers, the guide chasers being more remote from the center than the cutting chasers.

THORVALD PETERSEN.